United States Patent
Segev et al.

(10) Patent No.: US 10,715,995 B2
(45) Date of Patent: Jul. 14, 2020

(54) SECURITY PROTECTION OF MEASUREMENT REPORT

(71) Applicant: Intel IP Corporation, Santa Clara, CA (US)

(72) Inventors: Jonathan Segev, Sunnyvale, CA (US); Qinghua Li, San Ramon, CA (US); Benny Abramovsky, Petah Tikva (IL); Feng Jiang, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/335,510

(22) PCT Filed: Oct. 24, 2017

(86) PCT No.: PCT/US2017/058054
§ 371 (c)(1),
(2) Date: Mar. 21, 2019

(87) PCT Pub. No.: WO2018/081095
PCT Pub. Date: May 3, 2018

(65) Prior Publication Data
US 2020/0021979 A1 Jan. 16, 2020

Related U.S. Application Data

(60) Provisional application No. 62/412,048, filed on Oct. 24, 2016, provisional application No. 62/412,117, (Continued)

(51) Int. Cl.
*H04W 12/00* (2009.01)
*H04W 12/10* (2009.01)
(Continued)

(52) U.S. Cl.
CPC ....... *H04W 12/0013* (2019.01); *H04J 3/0667* (2013.01); *H04L 5/0023* (2013.01);
(Continued)

(58) Field of Classification Search
None
See application file for complete search history.

(56) References Cited

U.S. PATENT DOCUMENTS

2013/0336131 A1  12/2013  Zhang et al.
2015/0156794 A1*  6/2015  Kwon ............... H04W 72/1231
                                              370/329
(Continued)

FOREIGN PATENT DOCUMENTS

WO  WO-2016167609 A1  10/2016
WO  WO-2018081095 A1  5/2018

OTHER PUBLICATIONS

"International Application Serial No. PCT/US2017/058054, International Preliminary Report on Patentability dated May 9, 2019", 6 pgs.

(Continued)

*Primary Examiner* — Diane L Lo
(74) *Attorney, Agent, or Firm* — Schwegman Lundberg & Woessner, P.A.

(57) ABSTRACT

Methods, apparatus, and computer-readable media are described to encode a trigger frame for a second station (STA2). A first sounding frame for the STA2 is generated. The first timestamp is associated with a transmission of the first sounding frame. A second sounding frame from the STA2 based upon the first sounding frame is decoded. The second sounding frame includes a holding time indication associated with a second timestamp and a third timestamp. A fourth timestamp is associated with receiving the second sound frame. The holding time indication is protected. A (Continued)

round-trip time is calculated based upon the first timestamp, the holding time indication, and the fourth timestamp.

19 Claims, 14 Drawing Sheets

Related U.S. Application Data filed on Oct. 24, 2016, provisional application No. 62/412,137, filed on Oct. 24, 2016.

(51) Int. Cl.
| | | |
|---|---|---|
| *H04J 3/06* | (2006.01) | |
| *H04L 5/00* | (2006.01) | |
| *H04L 27/26* | (2006.01) | |
| *H04W 72/04* | (2009.01) | |
| *H04W 72/12* | (2009.01) | |

(52) U.S. Cl.
CPC ......... *H04L 5/0048* (2013.01); *H04L 5/0082* (2013.01); *H04L 27/2613* (2013.01); *H04W 12/1006* (2019.01); *H04W 72/0446* (2013.01); *H04W 72/1278* (2013.01)

(56) References Cited

U.S. PATENT DOCUMENTS

| | | | |
|---|---|---|---|
| 2016/0072689 A1 | 3/2016 | Aldana et al. | |
| 2016/0165534 A1 | 6/2016 | Kim et al. | |
| 2017/0033898 A1* | 2/2017 | Chun | H04W 84/12 |
| 2017/0171766 A1* | 6/2017 | Amizur | H04W 64/00 |
| 2017/0272138 A1* | 9/2017 | Chun | H04L 29/08 |
| 2018/0011179 A1* | 1/2018 | Zhang | G01S 11/026 |
| 2018/0359761 A1* | 12/2018 | Chun | H04L 5/0094 |
| 2019/0182793 A1* | 6/2019 | Wang | G01S 13/765 |

OTHER PUBLICATIONS

"International Application Serial No. PCT/US2017/058054, International Search Report dated Feb. 1, 2018", 3 pgs.

"International Application Serial No. PCT/US2017/058054, Written Opinion dated Feb. 1, 2018", 4 pgs.

Urs, Niesenet, et al., "Vehicular Ranging using Periodic Broadcasts", Vehicular Technology Conference (VTC Fall), 2015 IEEE 82nd, (Sep. 6, 2015), 1-5.

* cited by examiner

SECURITY PROTECTION OF MEASUREMENT REPORT

This application is a U.S. National Stage Filing under 35 U.S.C. 371 from International Application No. PCT/US2017/058054, filed on Oct. 24, 2017, which claims priority to U.S. Provisional Patent Application Ser. No. 62/412,048, filed Oct. 24, 2016, entitled "SHIFTED SOUNDING SIGNAL FOR SECURITY PROTECTION," U.S. Provisional Patent Application Ser. No. 62/412,117, filed Oct. 24, 2016, entitled "SECURITY PROTECTION OF MEASUREMENT REPORT," and U.S. Provisional Patent Application Ser. No. 62/412,137, filed Oct. 24, 2016, entitled "RANDOMIZED SOUNDING SIGNAL FOR SECURITY" which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to security techniques for ranging protocols. Some embodiments relate to IEEE 802.11az and/or 802.11mc.

BACKGROUND

IEEE 802.11az uses WiFi technology for ranging. Such ranging can involve frame exchanges over the air. For example, the measurement report for the sounding signal may be sent from the receiver to the sender. Currently, the measurement report may be readable to everyone and, therefore, vulnerable to eavesdropping. The eavesdropper may use the measurement report to derive the distance between the ranging devices. Such eavesdropping may jeopardize the privacy of the user and the security of certain usage applications.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
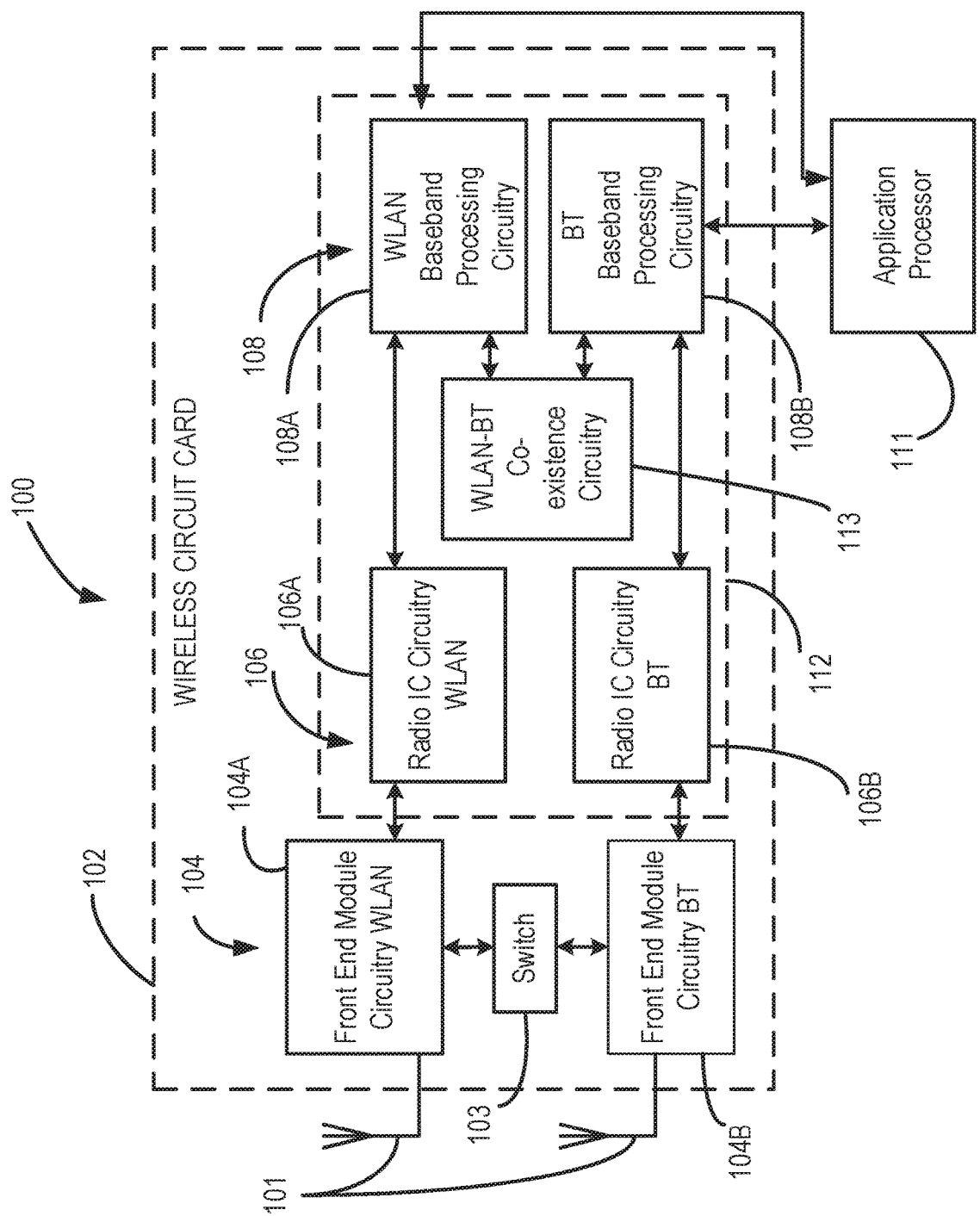
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
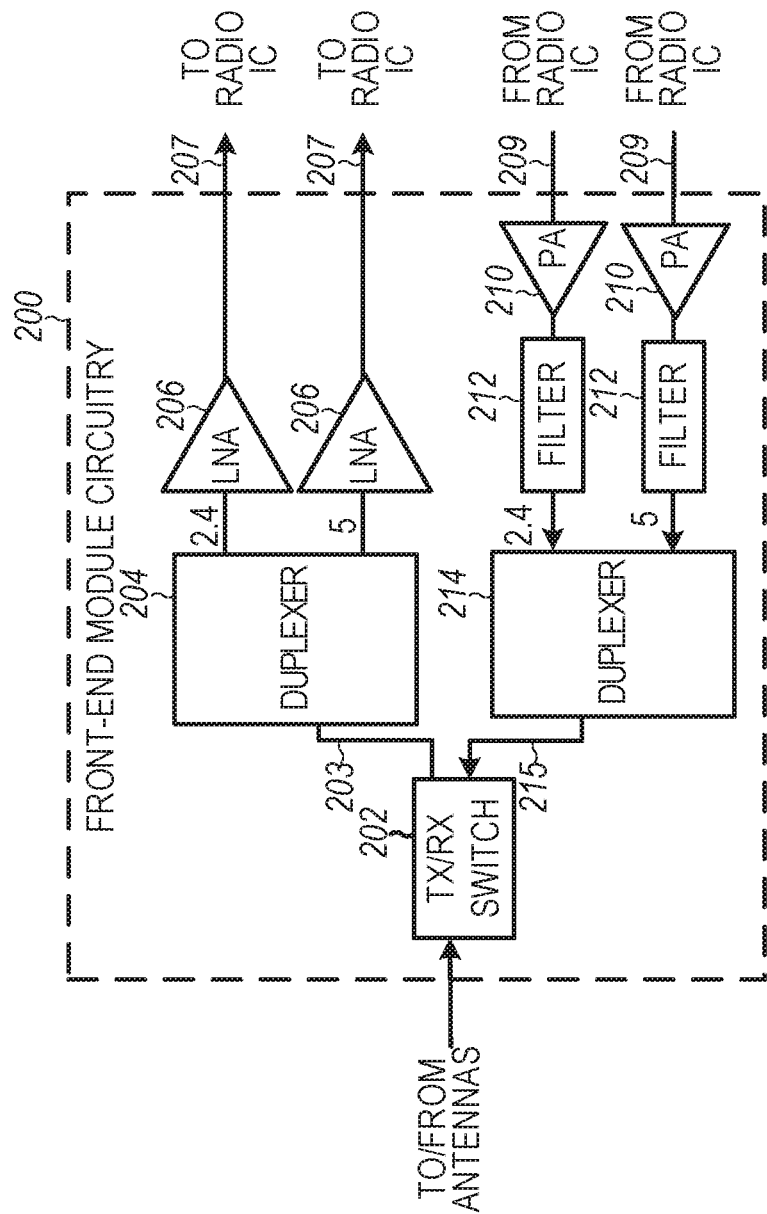
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
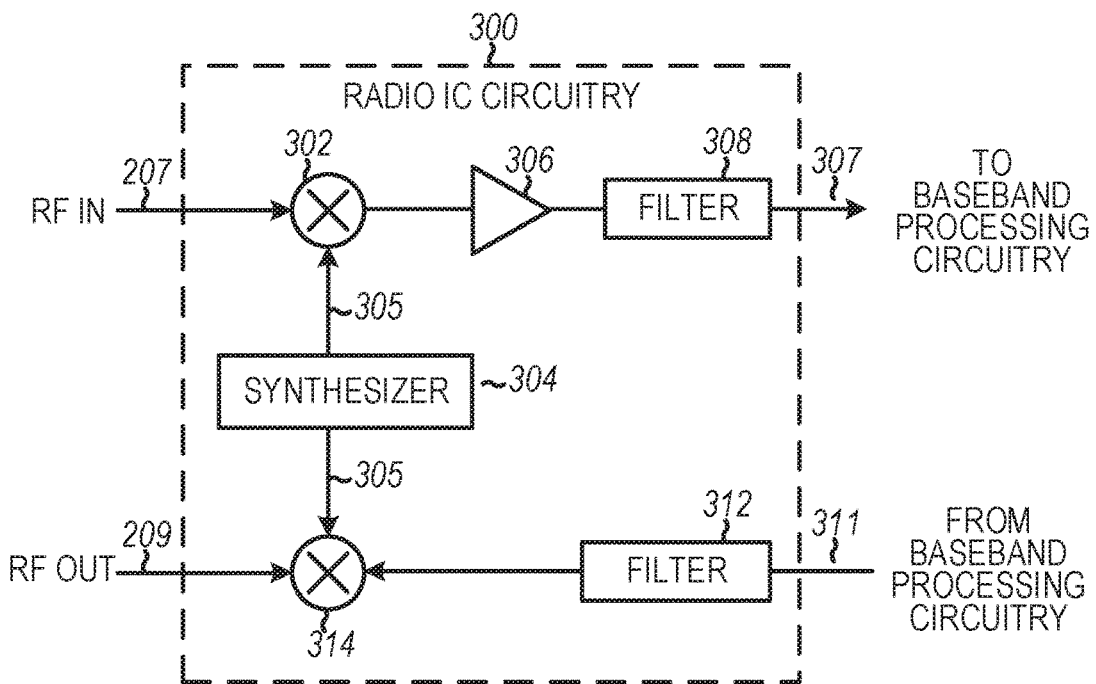
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
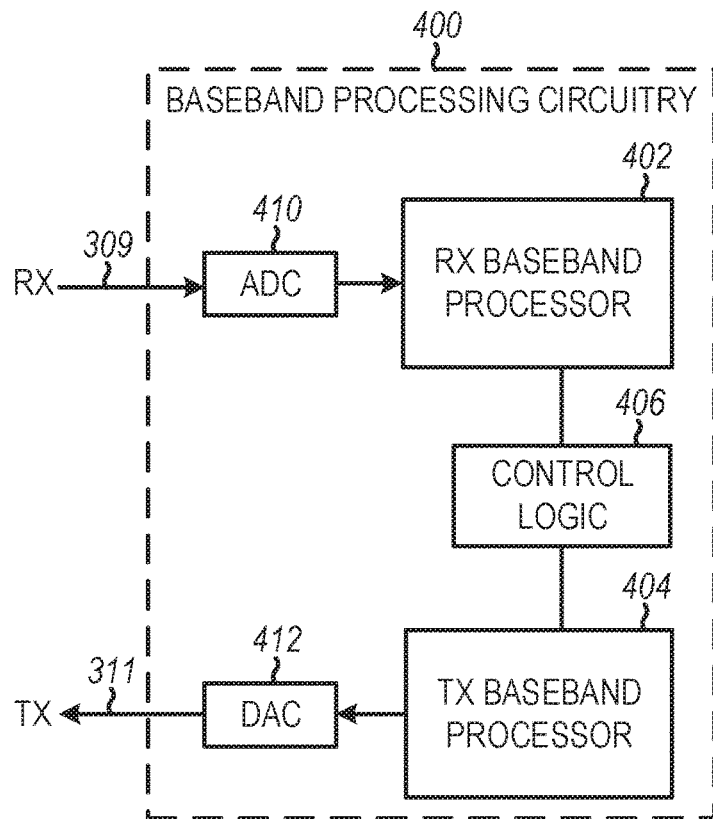
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
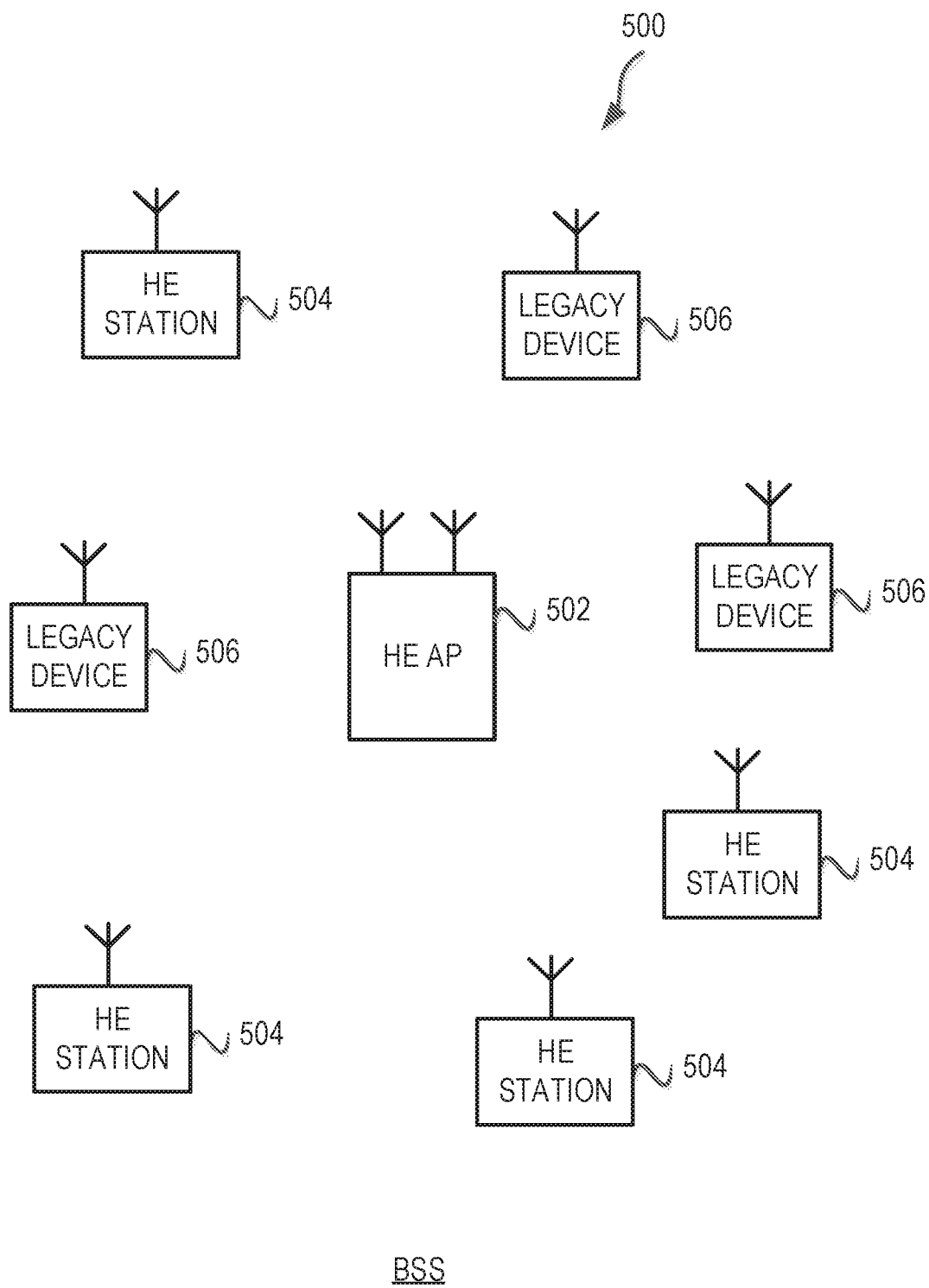
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or subcarriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.1 lax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-13.

In example embodiments, the HE station 504 and/or the HE AP 502 are configured to perform the methods and operations/functions described herein in conjunction with FIGS. 1-13. In example embodiments, an apparatus of the HE station 504 and/or an apparatus of the HE AP 502 are configured to perform the methods and functions described herein in conjunction with FIGS. 1-13. The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of an HE AP 502 may be referred to as HE AP STA. In some embodiments, a HE STA 504 may be referred to as a HE non-AP STA. In some embodiments, a HE STA 504 may be referred to as either a HE AP STA and/or HE non-AP.

Ranging protocols may use two different pieces of information. A measurement report and a sounding signal may be used in various ranging protocols. Either or both the measurement report and a sounding report may be protected. In an example, the transmission time of the sounding signal may be protected. For example, an eavesdropper will not know the exact transmission time, which is needed for calculating the round-trip time. In an example, the measurement report may be protected. For example, the measurement results may be scrambled or masked by a random sequence. The random sequence may be generated from a seed. The seed may be exchanged before the measurement report using an encryption protocol. For example, the STA may generate the random seed or receive the random seed. In an example, a random duration r may be added to time stamps or durations in the feedback between the ranging pair of devices. The random duration alters the distance calculation of the eavesdropper offset by $c·\tau/2$, where c is the speed of light. The STA applying r knows the random duration, and therefore, the STA may still calculate the correct distance by correcting for the offset.

In some wireless protocols, the sounding signal is the same as the channel training signal, e.g., Legacy Long Training Field (L-LTF), Very High Throughput (VHT)-LTF, and High Efficiency (HE)-LTF for data demodulation. Rather than use the same signal, the sounding signal may be a dynamically generated signal that would be unknown to an eavesdropper.

For MIMO or multiuser cases, the sounding signal may be carried by a separate frame. For example, a null data packet (NDP) frame may carry the sounding signal. The transmission time of the NDP frame may be announced by a preceding NDP announcement (NDPA) frame. Furthermore, the NDP may have a legacy prefix with L-STF, L-LTF, and Legacy Signal Field (L-SIG) such that the OFDM symbol boundary of the NDP sounding portion may be detected.

In some embodiments, if the receiver recognizes the sounding signal, which is dynamically generated by the sender of the NDP, the receiver may conduct the channel estimation to get the time of arrival of the first channel path. To prevent the receiver from recognizing the sounding signal, in some embodiments, the receiver may provide the received samples of the sounding signal back to the sender for estimating the time of arrival (ToA).

Figure 6:
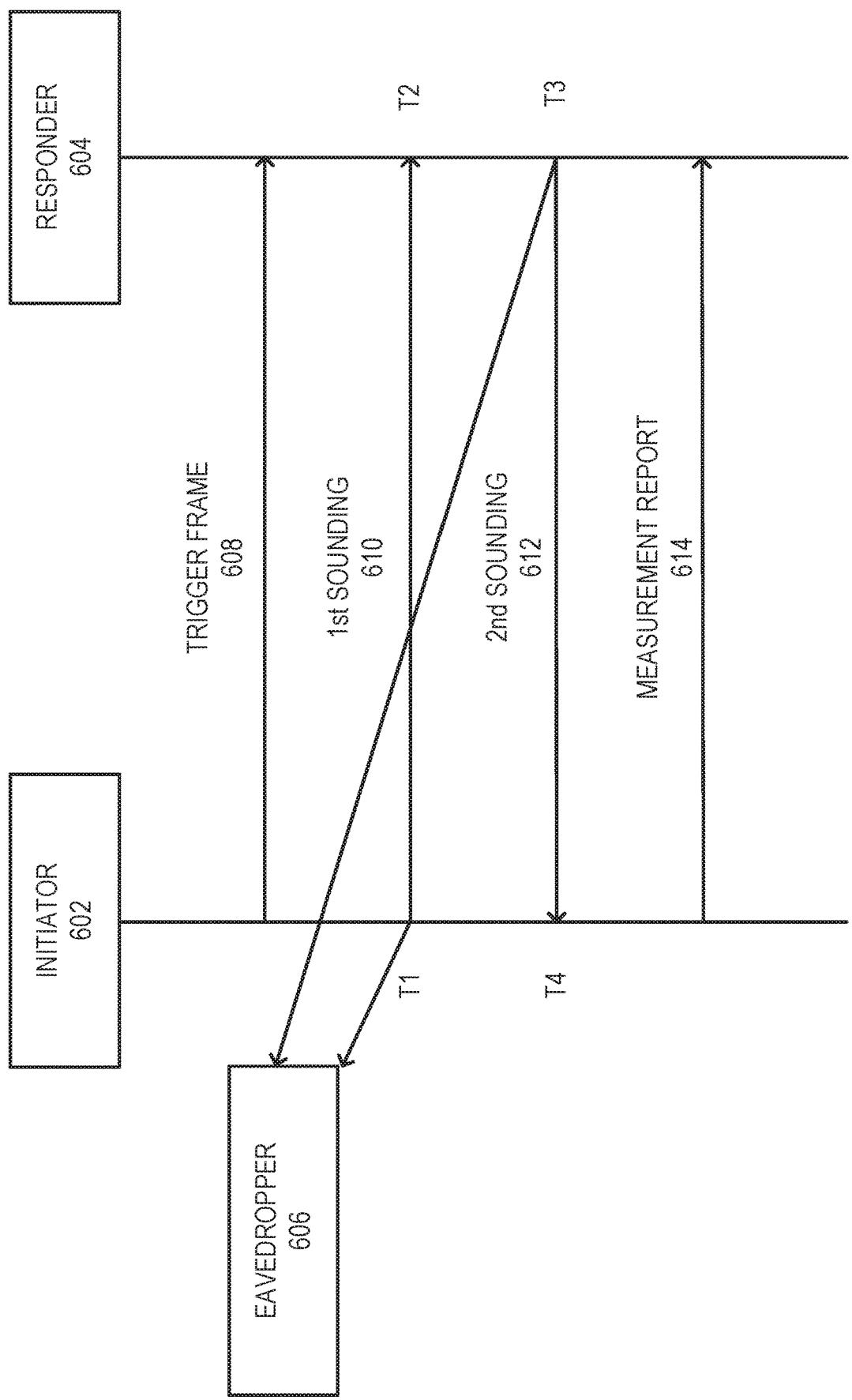
FIG. 6 illustrates protection of the transmission time in accordance with some embodiments.

FIG. 6 illustrates protection of the transmission time in accordance with some embodiments. An example of a ranging protocol is illustrated in FIG. 6, and such a protocol may in some embodiments be included in the specifications of IEEE 802.11az. For example, an initiator 602 may be an access point (AP) or in some embodiments the initiator 602 may be a station (STA). A responder 604 may be a STA or may be an AP. The directions of the 1st sounding 610 and the 2nd sounding 612 may be reversed. In multiuser cases, there may be multiple responders ranging with the initiator 602. FIG. 6 illustrates the measurement phase in accordance with various embodiments. There may be a negotiation phase before the measurement phase. Encryption information such as a random seed for protecting the measurement phase may be exchanged in the negotiation phase. Further protection information such as a new random seed may be carried by a subsequent trigger frame 608 and/or a report/feedback frame in the measurement phase in accordance with various embodiments. In an example, the trigger frame 608 solicits the first sounding frame 610. In another example, the trigger frame 610 may announce a sounding frame. In this example, the initiator 602 would then send a first sounding frame.

The measurement phase may obtain a round trip time (RTT) between the initiator 602 and the responder 604, which is proportional to the distance between the two ranging devices. The RTT may be calculated as illustrated in (1):

$$t_4 - t_1 - (t_3 - t_2) \qquad (1)$$

where $t_1$ is the sending time of the first sounding frame 610 at the initiator 602 (or responder 604); $t_4$ is the arrival time of the second sounding frame 612 at the initiator 602 (or responder 604); $t_2$ is the arrival time of the first sounding frame 610 at the responder 604 (or initiator 602); and $t_3$ is the sending time of the second sounding frame 612 at the responder 604 (or initiator 610).

From the initiator 602 viewpoint in FIG. 6, the first sounding signal 610 may leave at $t_1$ and come back at $t_4$. Subtracting the holding time at the responder 604 ($t_3-t_2$), the initiator 602 obtains the RTT as described above in (1). To protect the RTT, embodiments described herein may protect the four time instances, $t_1$, $t_2$, $t_3$, and $t_4$ as follows.

The holding time ($t_3-t_2$) may be randomized. For example, the holding time may include three parts, the duration of the first sounding frame 610, the short interframe space (SIFS), and a random shift. The SIFS may in some embodiments be 16 microseconds and the random shift may in some embodiments be uniformly distributed, for example, within [−0.4, +0.4] microseconds. The random shift may be known to the initiator 602 and/or the responder 604. The transmission time of the second sounding frame 612 need not be physically shifted, for example, to avoid causing multiuser interference in multiuser case. Instead, the existing cyclic shift diversity (CSD) may be used, for example in some embodiments, as specified in IEEE 802.11n/ac/ax, for obtaining spatial diversity. In some embodiments, the linear phase shift may be multiplied on the sounding frame across various frequencies without actually changing the transmission time. The slope of the linear phase shift may be determined by the random shift. The random shift may be applied to the second sounding frame 612 and/or the first sounding frame 610. When the random shift is applied to the first sounding frame 610, it may change $t_1$ equivalently. Similarly, when it is applied to the second sounding frame 612, it may change $t_3$ equivalently. Applying the CSD to the second sounding frame 612 may be more desirable than applying the CSD to the first sounding frame 610.

Figure 7:
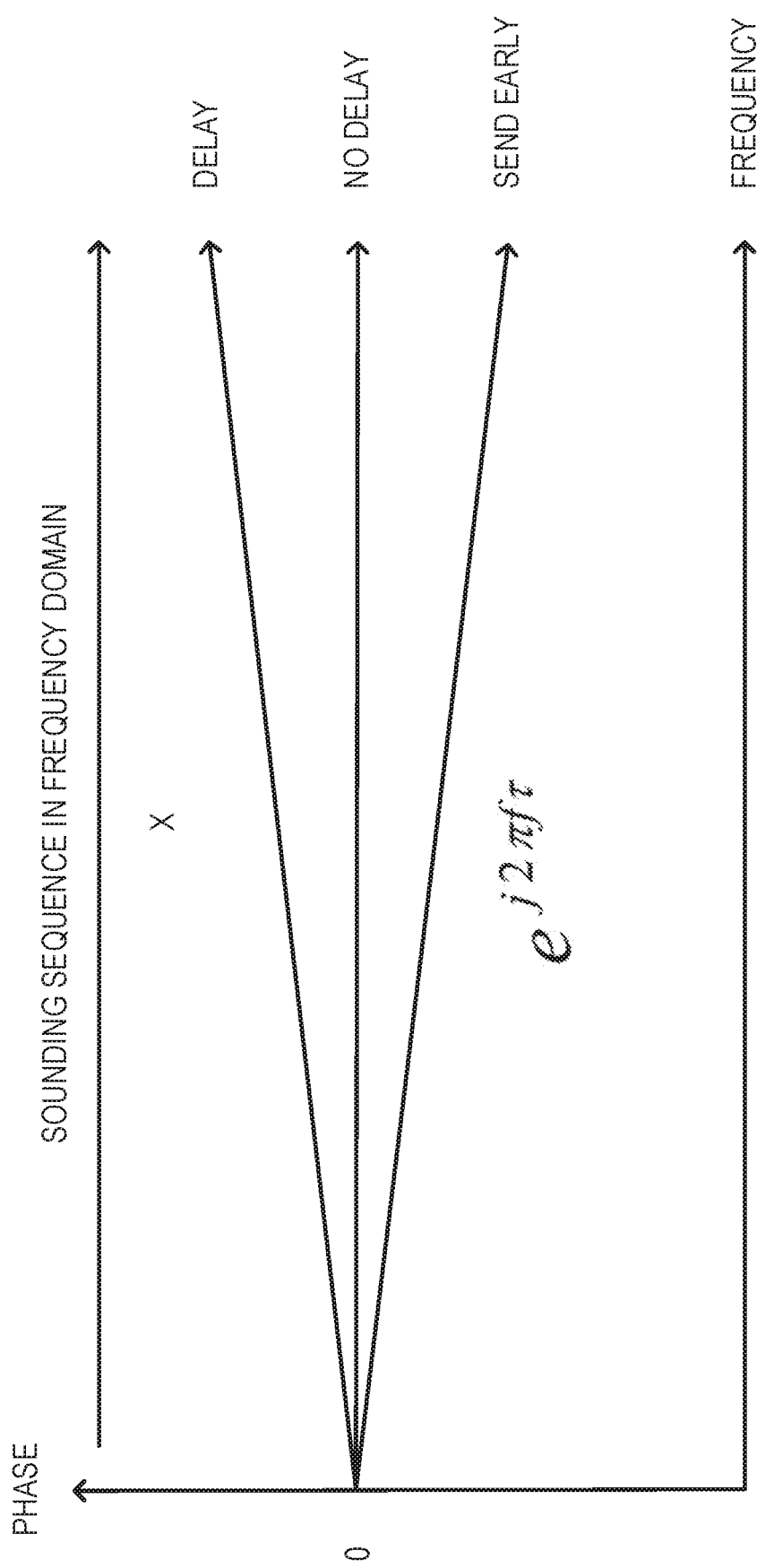
FIG. 7 illustrates cyclic shift diversity (CSD) operation in accordance with some embodiments.

The CSD operation is illustrated in FIG. 7. A linear phase shift $e^{j2\pi f \tau}$ may be added to the sounding signal across various frequencies. The slope of the linear shift may be determined by the random shift $\tau$. Because CSD may be used under IEEE 802.11n/ac for obtaining spatial diversity, the existing hardware may be reused without adding additional costs.

Figure 8:
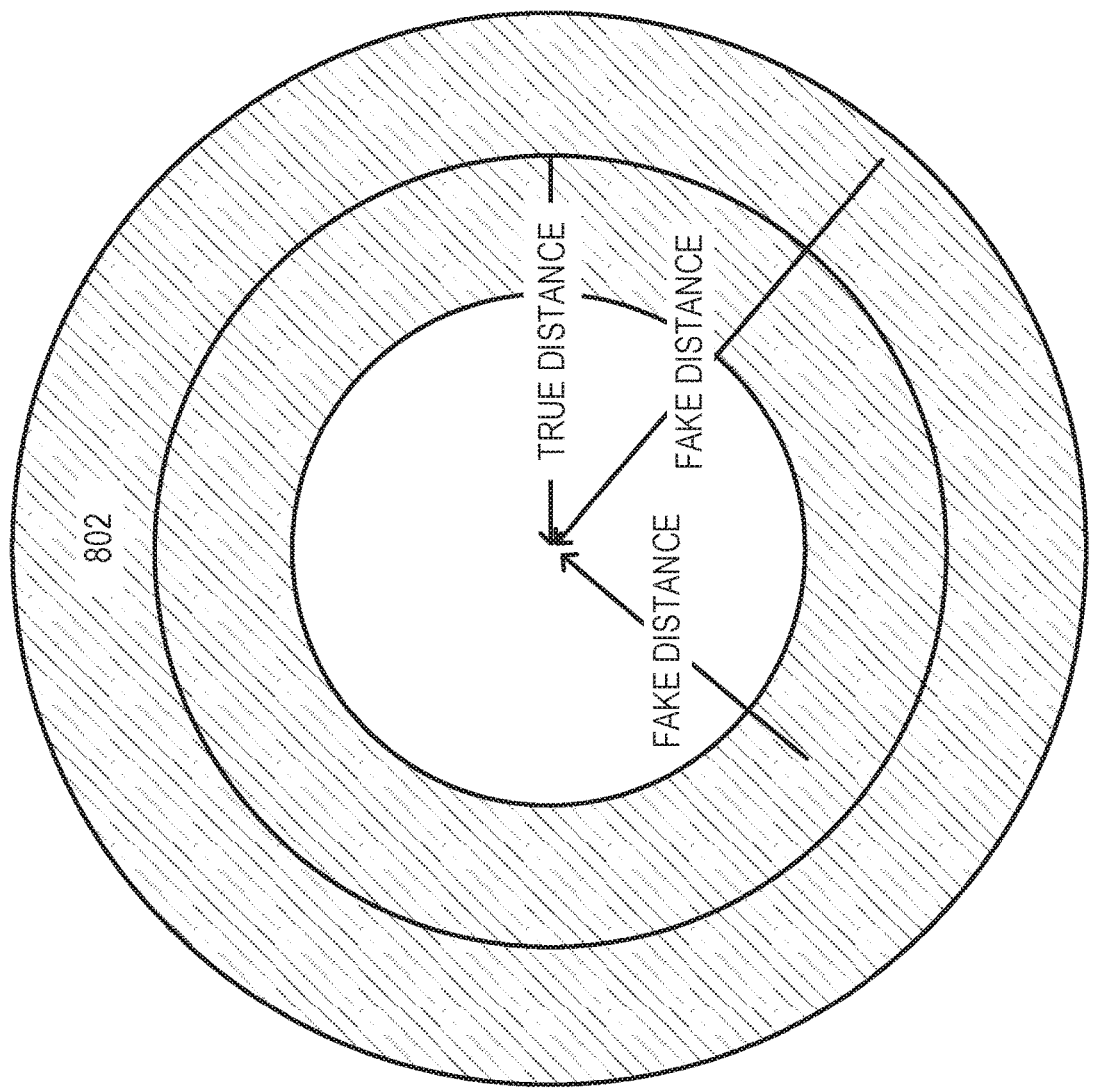
FIG. 8 illustrates locations perceived by the eavesdropper after a random shift in accordance with some embodiments.

By protecting the transmission time, an eavesdropper (e.g. sitting next to the initiator 602) may not be able to find the exact location of the responder in accordance with various embodiments described herein. For example, the exact location may be hidden in a ring 802 as illustrated in FIG. 8.

Figure 9:
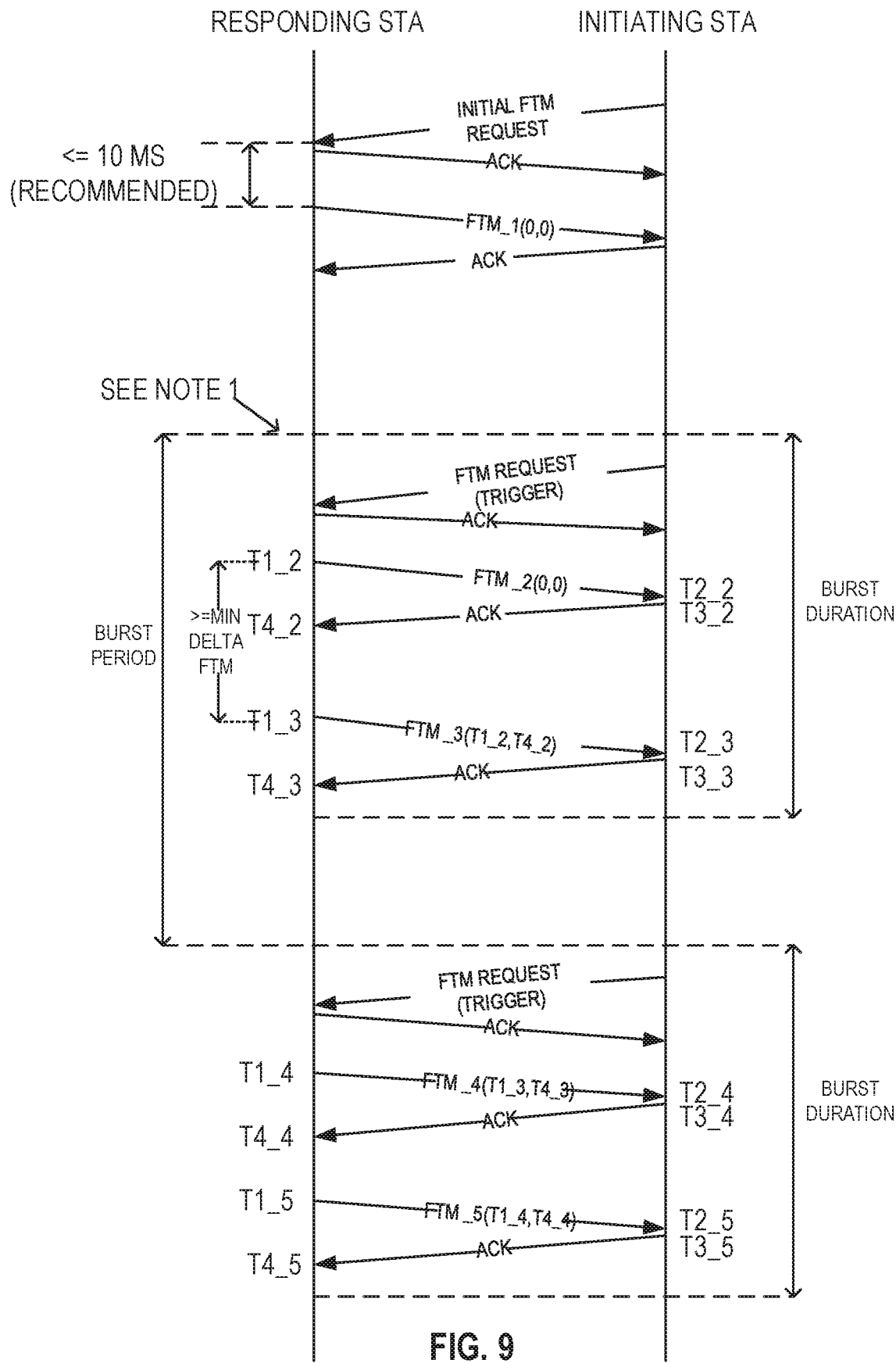
FIG. 9 illustrates an example of negotiation and measurement exchange sequence, where for example ASAP may be 0, and FTMs per burst may be 2, in accordance with some embodiments.

Protection of the four time instances may also be applied to the single user Single-Input, Single Output (SISO) protocol described in IEEE 802.11mc. An example of a protocol for various embodiments of negotiation and measurement exchange sequences is illustrated in FIG. 9. For example, an initiating STA 904 may be a client station and a responding STA 902 may be an AP. The random shift may be applied to the acknowledgement (ACK) frames, which may carry the second sounding signal 612 in FIG. 6. For example, in some embodiments, t3_2, t3_3, t3_4, and t3_5 may be shifted by an actual delay or by CSD phase insertion.

There may be several versions of the measurement report. Embodiments of the measurement report may be sent by the initiator and/or the responder. In some embodiments, measurement reports can include time stamps such as $t_1$, $t_2$, $t_3$, and $t_4$, as shown in FIG. 6. Measurement reports can also in some embodiments include durations such as ($t_3-t_2$) and ($t_4-t_1$). In some embodiments, measurement reports may include channel state information (CSI) such as channel estimates that are estimated from the sounding frames.

A measurement report may be used in various ways. In some embodiments, the initiator may send $t_1$ and $t_4$ or ($t_4-t_1$) to the responder so that the responder may identify the RTT using formula (1). Similarly, in some embodiments, if the initiator needs the RTT, the responder may send the initiator a measurement report that may include: $t_3$, and $t_2$, or ($t_3-t_2$), or a calculated RTT, or a combination thereof.

Similarly, the responder may send $t_2$ and $t_3$ or ($t_3-t_2$) to the initiator so that the initiator may identify RTT using formula (1). Similarly, if the responder needs the RTT, the initiator may send the responder a measurement report with $t_1$ and $t_4$ or ($t_4-t_1$), or the calculated RTT, or a combination thereof.

The initiator may send $t_1$ and the channel estimates of the second sounding frame (in a measurement report) to the responder so that the responder may, for example, estimate $t_4$ and then identify the RTT using formula (1). Similarly, if the initiator needs the RTT, the responder may send $t_3$ and the channel estimates of the first sounding frame (in a measurement report) to the initiator so that the initiator can estimate $t_2$ and then identify the RTT using formula (1). Or, in some embodiments, the responder may send the calculated RTT directly.

The responder may send $t_3$ and the channel estimates of the first sounding frame (in a measurement report) to the initiator so that the initiator may estimate $t_2$ and then identify the RTT using formula (1). Similarly, if the responder needs the RTT, the initiator may send $t_1$ and the channel estimates of the second sounding frame (in a measurement report) to the responder so that the responder can estimate $t_4$ and then identify the RTT using formula (1). Or, in some embodiments the initiator may send the calculated RTT directly.

Usage of measurement reports pursuant to IEEE 802.11mc is illustrated in FIG. 9. Such measurement reports may contain time stamps such as (0,0), (t1_2, t4_2), (t1_3, t4_3), and (t1_4, t4_4) as illustrated in FIG. 9.

To protect the RTT, the measurement report may be protected in various ways. In an example, the time stamps such as $t_1$, $t_2$, $t_3$, and $t_4$ may be scrambled in the report. The channel state information (CSI) may also be scrambled in the report. A random linear phase shift may be added to the CSI. This may be equivalent to applying a cyclic shift diversity (CSD) to the sounding frame. The random number is unknown to the eavesdropper. In some embodiments, a random number may be added to the time stamp in the report. The random number is unknown to the eavesdropper.

Figure 10:
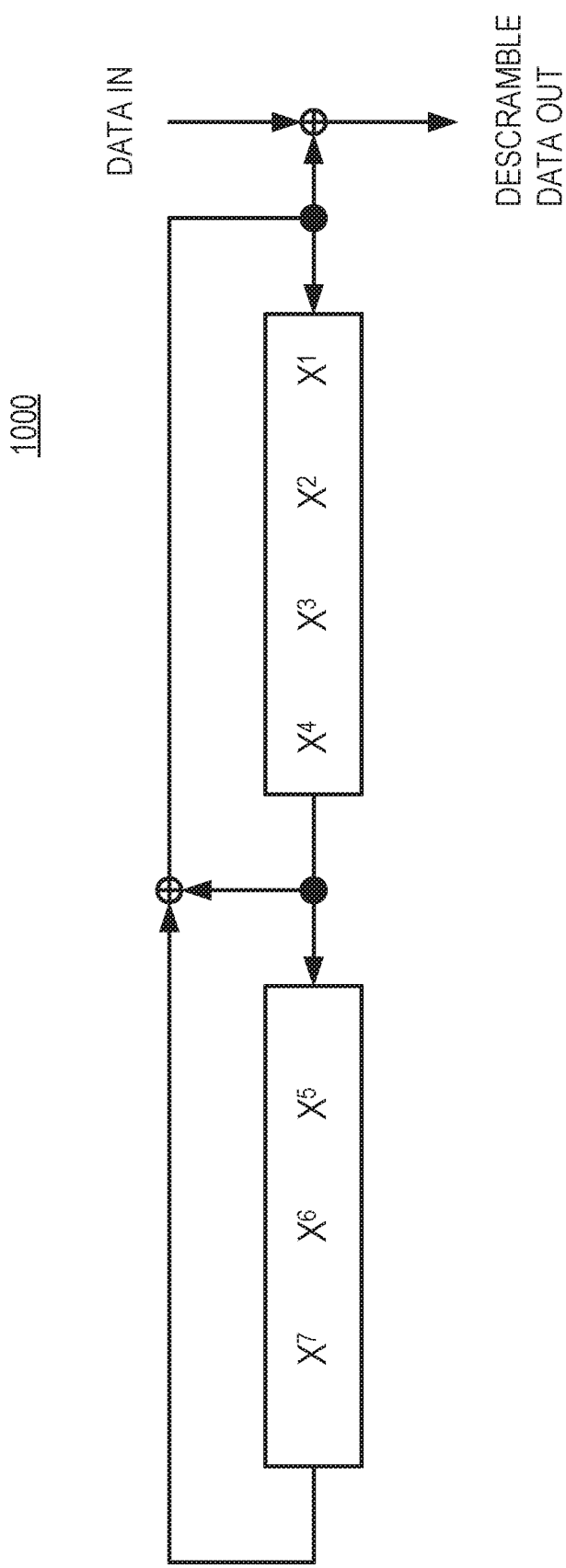
FIG. 10 illustrates an example of a data scrambler under IEEE 802.11 in accordance with some embodiments.

The scrambling and number adding embodiments may be replaced by other types of encryption. However, the complexity of another encryption is in some embodiments quite high and may cause a long latency. Such latency may make meeting the SIFS return time difficult. In an example, scrambling and number adding may be used. The currently employed scrambler used pursuant to an IEEE 802.11 data payload is illustrated in FIG. 10. Such a scrambler 1000 may be used for protecting measurement reports. The scrambler may generate a random masking sequence, for example, by using a random seed. The generated sequence may be added to data that is to be protected using an XOR operation. The scrambled data may be unscrambled by adding the same masking sequence. In some embodiments, the random seed may be exchanged before the measurement phase, for example, in the negotiation phase over an encrypted exchange. For security enhancement, the random seed may be updated during the measurement phase over scrambled data, number-added data or data encrypted by other methods.

One advantage of adding one or more random numbers to time stamps may be as follows. In some embodiments, the random numbers may not be known to the receiver of the measurement report. For example, STA 1 can send time stamps with added random numbers to STA 2 and in some embodiments STA 1 may then receive the RTT calculated by STA 2. STA 1 may remove the random numbers from the received RTT in some embodiments to identify the true RTT.

One example is as follows. In FIG. 6, after receiving two sounding frames, in some embodiments the responder may send $t_2+\tau_2$ and $t_3+\tau_3$ to the initiator, where $\tau_2$ and $t_3$ are the added random numbers unknown to the initiator and the eavesdropper. The initiator may calculate the RTT using formula (2):

$$RRR_{random}=t_4-t_1[(t_{3+\tau3})-(t_{2+\tau2})]=t_4-t_1-(t_3+t_2)+(\tau_2-\tau_3)$$

where: $(\tau_2-\tau_3)$ is the random shift added to the true RTT, $t_4-t_1-(t_3+t_2)$. Because the responder knows $\tau_2$ and $\tau_3$ in some embodiments the responder can remove the random shift $(\tau_2-\tau_3)$ from the $RTT_{random}$ fed back by the initiator to get the true RTT in accordance with various embodiments.

In some embodiments, the random numbers may need to be known by the receiver of the measurement report. In such embodiments, a random seed for a random number generator may need to be exchanged before the measurement report, for example, during the negotiation phase. For example, a random seed for a random number generator may in some embodiments be exchanged over an encrypted exchange. The random number generator may be similar to the scrambler illustrated in FIG. 10. The random seed may be updated during the measurement phase over data with the added random number in accordance with various embodiments.

When the measurement report carries CSI feedback, the channel estimates may be scrambled by a masking sequence. In some embodiments, a linear phase shift may be added to the channel responses across frequencies in a manner similar to that of cyclic shift diversity (CSD). In some embodiments, the slope of the linear phase shift may be random and the seed to generate the random slope may be exchanged before the measurement report.

Figure 11:
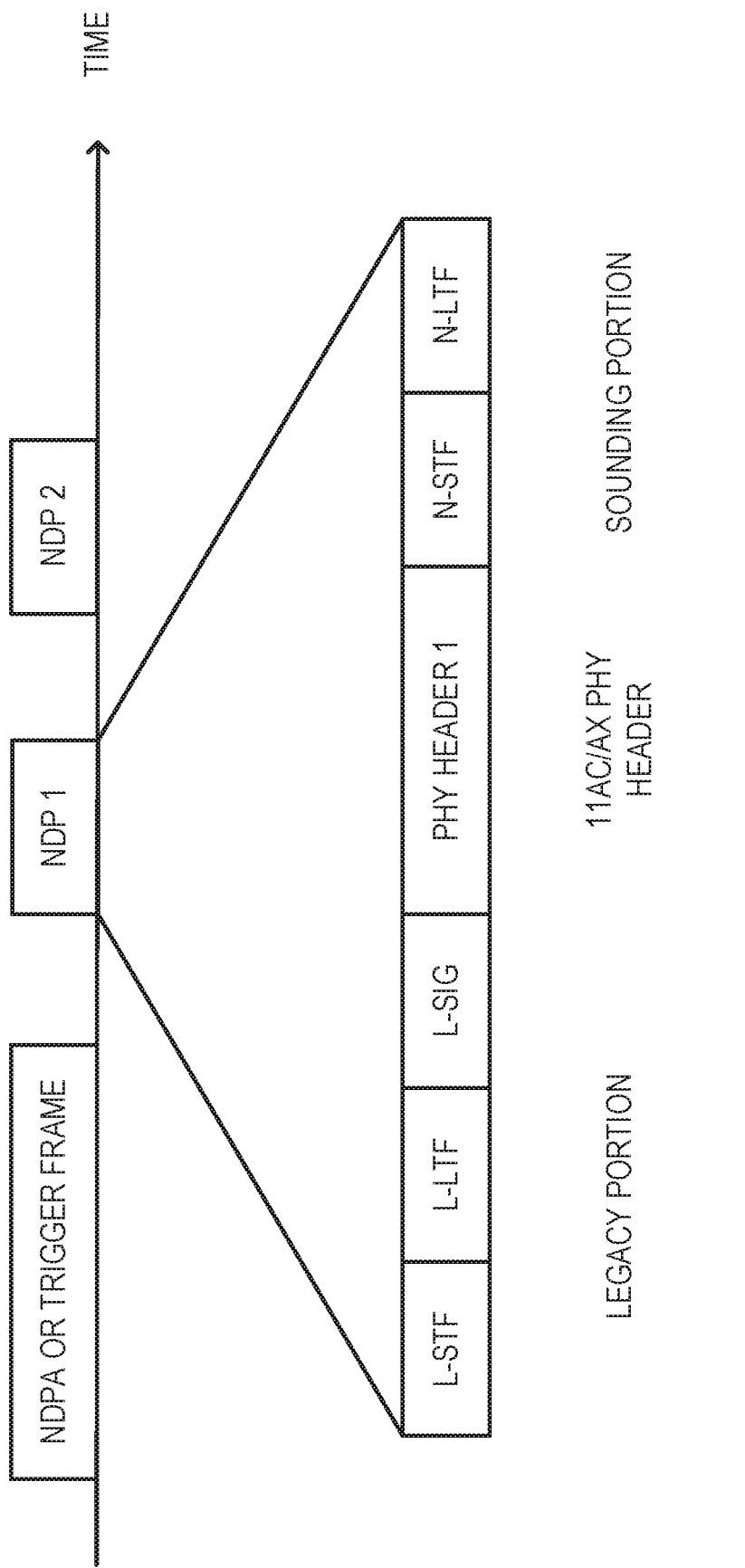
FIG. 11 illustrates a structure of a sounding signal in accordance with some embodiments.

An embodiment of a frame structure for a sounding signal is illustrated in FIG. 11. For detecting the arrival of the NDP, the legacy portion may be used. For estimating the channel response, the sounding portion may be used. In some embodiments, N-STF (New-short training field) may be for automatic gain control (AGC) setting and in some embodiments N-LTF (New-long term training field) may be used for channel estimation. The channel estimation may be for finding the time of arrival of the first channel path. The N-STF and N-LTF may be the conventional (e.g., VHT-STF, VHT-LTF) or high efficiency (e.g., HE-STF, HE-LTF). However, the conventional (VHT-STF, VHT-LTF) and the high efficiency (HE-STF, HE-LTF) may be readable by the eavesdropper. Therefore, the N-LTF part may be unreadable to eavesdropper.

Figure 12:
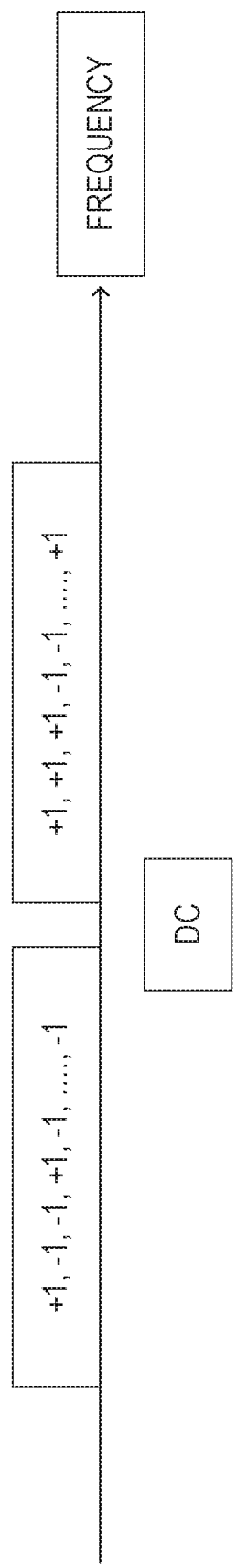
FIG. 12 illustrates a long training field (LTF) sequence in accordance with some embodiments.

FIG. 12 illustrates a long training field (LTF) sequence in accordance with some embodiments. The N-LTF may consist of a sequence of symbols in a frequency domain. The symbols may consist of the binary −1 and +1 for embodiments pursuant to IEEE 802.11a/n/ac/ax. The sequence may be optimized for achieving a low Peak-to-Average Power Ratio (PAPR). For security and privacy, the N-LTF sequence may be dynamically generated to be different from embodiments pursuant to IEEE 802.11a/n/ac/ax.

There are various ways to generate random binary sequences. For example, in some embodiments the scrambling sequence generator used for embodiments pursuant to IEEE 802.11 may be used or reused for generating a random binary sequence. In some embodiments, a random seed may be exchanged before the measurement phase, for example, in the negotiation phase between the transmitter and receiver. The random seed may be sent by an encrypted protocol. Using the same random seed, the transmitter and the receiver may generate the same sounding sequence synchronously.

Figure 13:
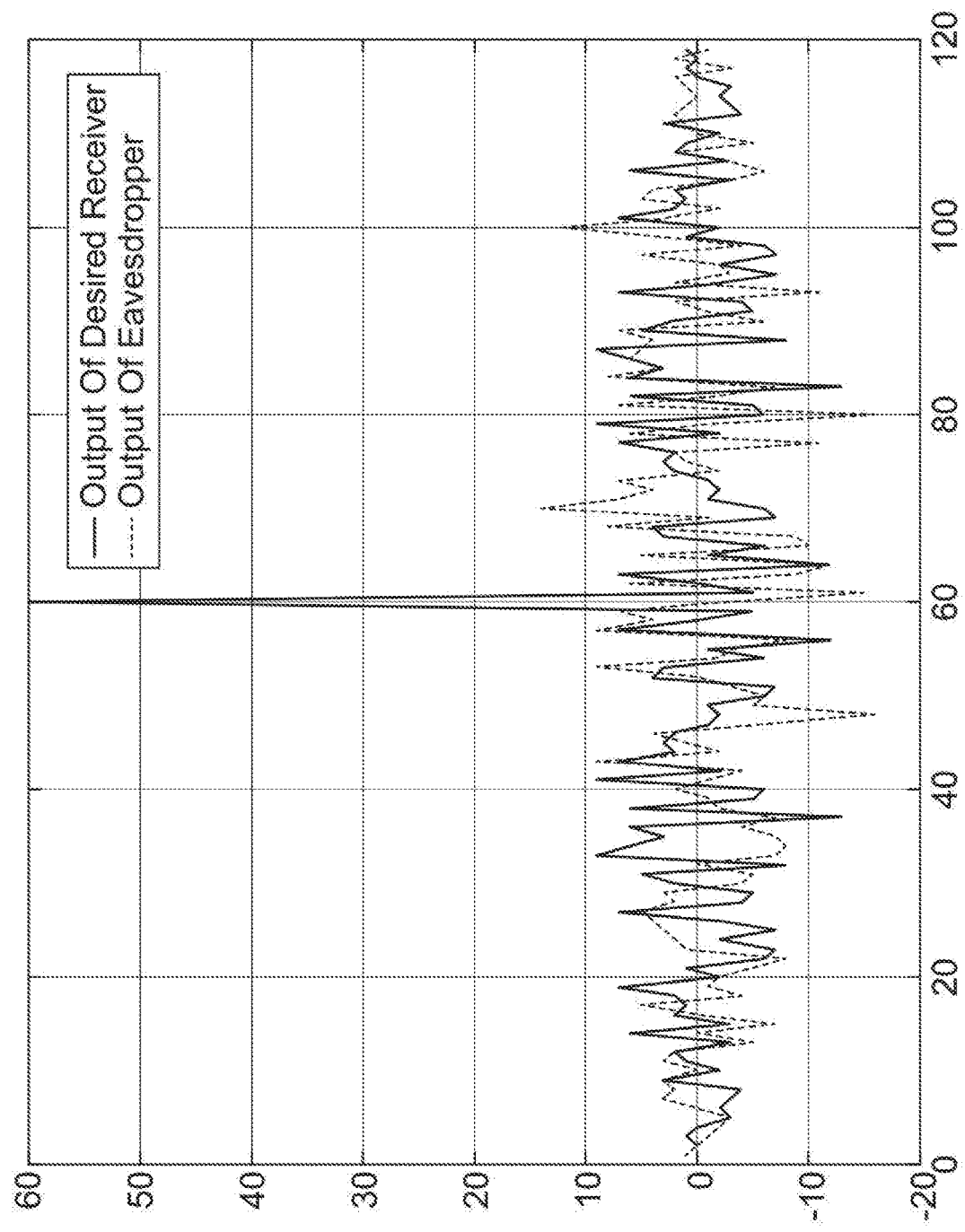
FIG. 13 illustrates output of detectors with and without the knowledge of the random sequence, where the x-axis is the arrival time and the y-axis is the output of the matched filter in accordance with some embodiments.

FIG. 13 illustrates an example of detector output of the desired receiver and of a potential eavesdropper in accordance with various embodiments. In some embodiments, the desired receiver recognizes the random sounding sequence but the eavesdropper does not recognize the random sounding sequence. The channel may only have a single path and the detector may be a matched filter. The desired receiver may detect the arrival of the path with a sharp peak in the detector output. The eavesdropper does not know the sounding sequence and cannot detect the arrival of the path accurately.

In some ranging applications, the receiver of the sounding signal cannot process the received sounding signal. Instead, in some embodiments the receiver feeds the received signals back to the transmitter for estimating the time of arrival (ToA). In such embodiments, the random sequence may not need to be known at the receiver if the receiver does not estimate the channel response before feeding back. As the transmitter knows the random sequence, the transmitter may detect the ToA using the feedback. Therefore, the random seed exchange may not be needed in some embodiments and the transmitter may use whatever random sequence it may select, for example, any with a low PAPR.

The ranging protocol in IEEE 802.11 mc may be for a single user with a single antenna, for example as illustrated in FIG. 9. The initiating STA may be a client station and the responding STA may be an AP. The sounding signal may in some embodiments be the LTF symbols used for demodulating the payload in the FTM and ACK frames. Therefore, in some embodiments the receiver may know the sounding sequence. Otherwise, the receiver may not be able to demodulate the FTM and ACK frame. Random seed exchange may in some embodiments be needed before the sounding.

Figure 14:
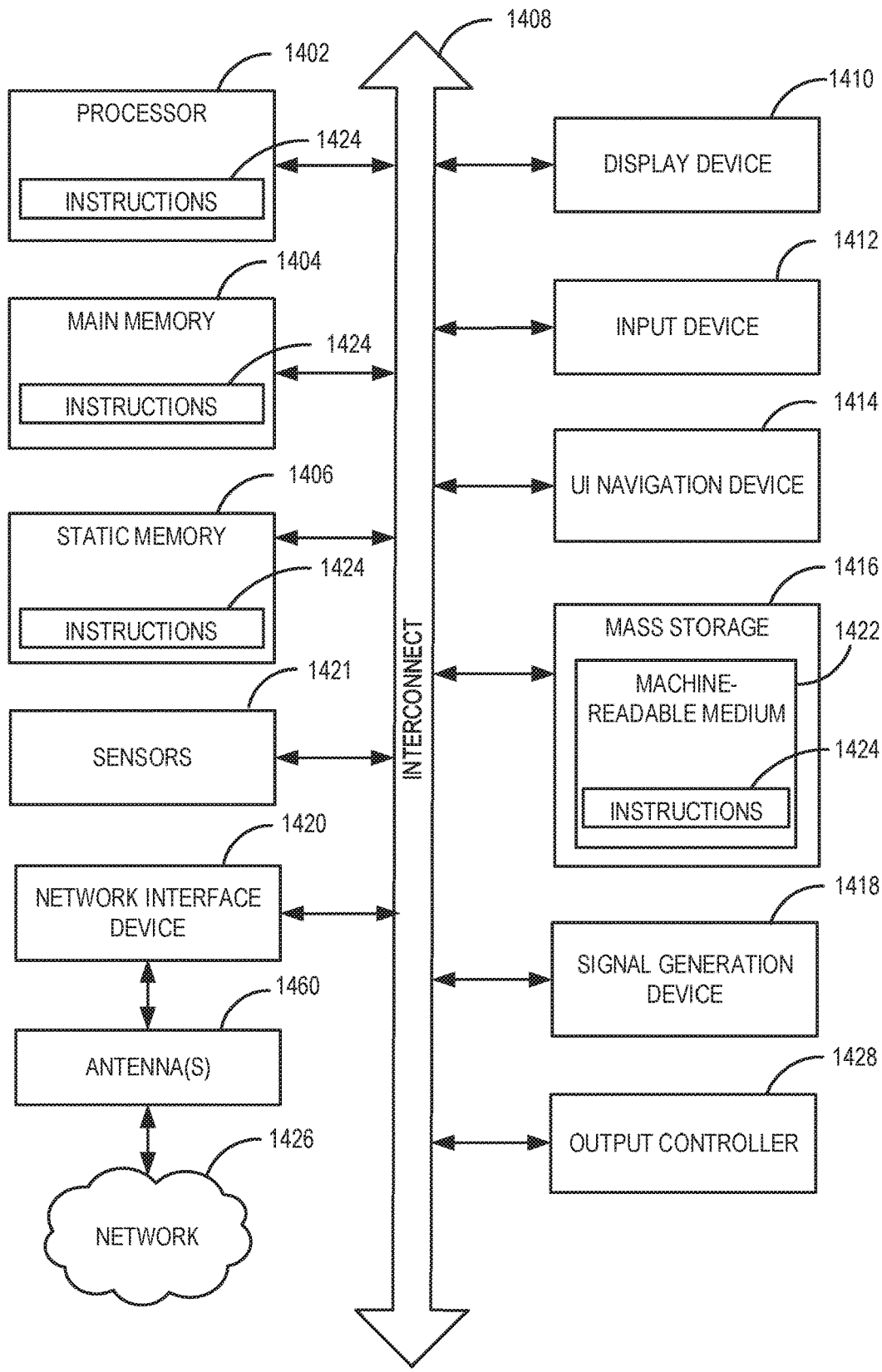
FIG. 14 illustrates a block diagram of an example machine upon which any one or more of the techniques (e.g., methodologies) discussed herein may perform.

FIG. 14 illustrates a block diagram of an example machine 1400 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408.

Specific examples of main memory 1404 include Random Access Memory (RAM), and semiconductor memory devices, which may include, in some embodiments, storage locations in semiconductors such as registers. Specific examples of static memory 1406 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1400 may further include a display device 1410, an input device 1412 (e.g., a keyboard), and a user interface (UI) navigation device 1414 (e.g., a mouse). In an example, the display device 1410, input device 1412 and UI navigation device 1414 may be a touch screen display. The machine 1400 may additionally include a mass storage (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1402 and/or instructions 1424 may comprise processing circuitry and/or transceiver circuitry.

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1422 is illustrated as a single medium, the term "machine readable medium" may include a single medium or multiple media (e.g., a centralized or distributed database, and/or associated caches and servers) configured to store the one or more instructions 1424.

An apparatus of the machine 1400 may be one or more of a hardware processor 1402 (e.g., a central processing unit (CPU), a graphics processing unit (GPU), a hardware processor core, or any combination thereof), a main memory 1404 and a static memory 1406, sensors 1421, network interface device 1420, antennas 1460, a display device 1410, an input device 1412, a UI navigation device 1414, a mass storage 1416, instructions 1424, a signal generation device 1418, and an output controller 1428. The apparatus may be configured to perform one or more of the methods and/or operations disclosed herein. The apparatus may be intended as a component of the machine 1400 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1420 may include one or more physical jacks (e.g., Ethernet, coaxial, or phone jacks) or one or more antennas to connect to the communications network 1426. In an example, the network interface device 1420 may include one or more antennas 1460 to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" shall be taken to include any intangible medium that is capable of storing, encoding or carrying instructions for execution by the machine 1400, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 15:
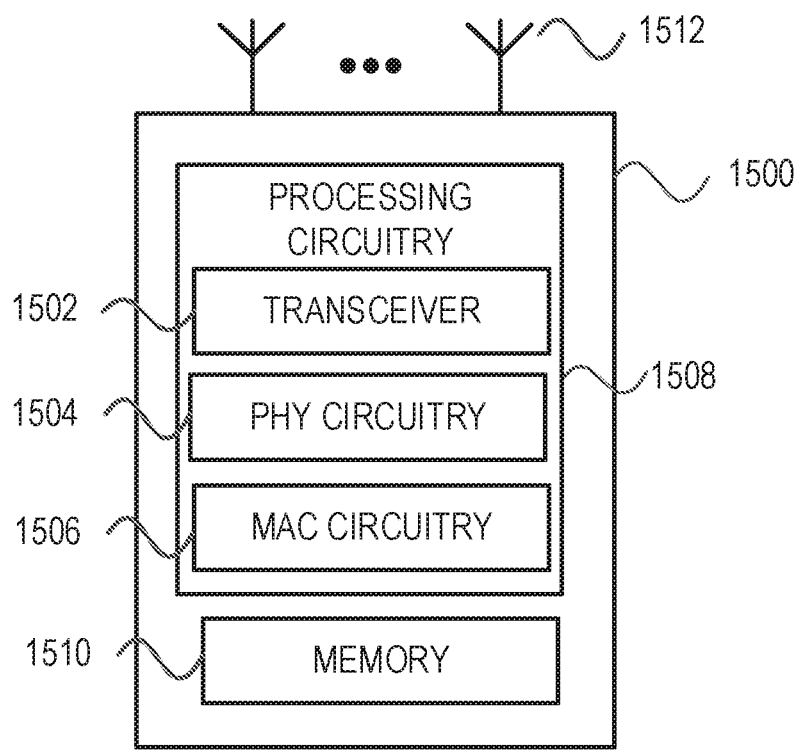
FIG. 15 illustrates a block diagram of an example wireless device upon which any one or more of the techniques (e.g., methodologies or operations) discussed herein may perform.

FIG. 15 illustrates a block diagram of an example wireless device 1500 upon which any one or more of the techniques (e.g., methodologies or operations) discussed herein may perform. The wireless device 1500 may be a HE device. The wireless device 1500 may be a HE STA 504 and/or HE AP 502 (e.g., FIG. 5). A HE STA 504 and/or HE AP 502 may include some or all of the components shown in FIGS. 1-13. The wireless device 1500 may be an example machine 1400 as disclosed in conjunction with FIG. 14.

The wireless device 1500 may include processing circuitry 1508. The processing circuitry 1508 may include a transceiver 1502, physical layer circuitry (PHY circuitry) 1504, and MAC layer circuitry (MAC circuitry) 1506, one or more of which may enable transmission and reception of signals to and from other wireless devices 1500 (e.g., HE AP 502, HE STA 504, and/or legacy devices 506) using one or more antennas 1512. As an example, the PHY circuitry 1504 may perform various encoding and decoding functions that may include formation of baseband signals for transmission and decoding of received signals. As another example, the transceiver 1502 may perform various transmission and reception functions such as conversion of signals between a baseband range and a Radio Frequency (RF) range.

Accordingly, the PHY circuitry 1504 and the transceiver 1502 may be separate components or may be part of a combined component, e.g., processing circuitry 1508. In addition, some of the described functionality related to transmission and reception of signals may be performed by a combination that may include one, any or all of the PHY circuitry 1504 the transceiver 1502, MAC circuitry 1506, memory 1510, and other components or layers. The MAC circuitry 1506 may control access to the wireless medium. The wireless device 1500 may also include memory 1510 arranged to perform the operations described herein, e.g., some of the operations described herein may be performed by instructions stored in the memory 1510.

The antennas 1512 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1512 may be effectively separated to take advantage of spatial diversity and the different channel characteristics that may result.

One or more of the memory 1510, the transceiver 1502, the PHY circuitry 1504, the MAC circuitry 1506, the antennas 1512, and/or the processing circuitry 1508 may be coupled with one another. Moreover, although memory 1510, the transceiver 1502, the PHY circuitry 1504, the MAC circuitry 1506, the antennas 1512 are illustrated as separate components, one or more of memory 1510, the transceiver 1502, the PHY circuitry 1504, the MAC circuitry 1506, the antennas 1512 may be integrated in an electronic package or chip.

In some embodiments, the wireless device 1500 may be a mobile device as described in conjunction with FIG. 14. In some embodiments the wireless device 1500 may be configured to operate in accordance with one or more wireless communication standards as described herein (e.g., as described in conjunction with FIGS. 1-14, IEEE 802.11). In some embodiments, the wireless device 1500 may include one or more of the components as described in conjunction with FIG. 14 (e.g., display device 1410, input device 1412, etc.) Although the wireless device 1500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 1500 may include various components of the wireless device 1500 as shown in FIG. 15 and/or components from FIGS. 1-14. Accordingly, techniques and operations described herein that refer to the wireless device 1500 may be applicable to an apparatus for a wireless device 1500 (e.g., HE AP 502 and/or HE STA 504), in some embodiments. In some embodiments, the wireless device 1500 is configured to decode and/or encode signals, packets, and/or frames as described herein, e.g., PPDUs.

In some embodiments, the MAC circuitry 1506 may be arranged to contend for a wireless medium during a contention period to receive control of the medium for a HE TXOP and encode or decode an HE PPDU. In some embodiments, the MAC circuitry 1506 may be arranged to contend for the wireless medium based on channel contention settings, a transmitting power level, and a clear channel assessment level (e.g., an energy detect level).

The PHY circuitry 1504 may be arranged to transmit signals in accordance with one or more communication standards described herein. For example, the PHY circuitry 1504 may be configured to transmit a HE PPDU. The PHY circuitry 1504 may include circuitry for modulation/demodulation, upconversion/downconversion, filtering, amplification, etc. In some embodiments, the processing circuitry 1508 may include one or more processors. The processing circuitry 1508 may be configured to perform functions based on instructions being stored in a RAM or ROM, or based on special purpose circuitry. The processing circuitry 1508 may include a processor such as a general purpose processor or special purpose processor. The processing circuitry 1508 may implement one or more functions associated with antennas 1512, the transceiver 1502, the PHY circuitry 1504, the MAC circuitry 1506, and/or the memory 1510. In some embodiments, the processing circuitry 1508 may be configured to perform one or more of the functions/operations and/or methods described herein.

In mmWave technology, communication between a station (e.g., the HE stations 504 of FIG. 5 or wireless device 1500) and an access point (e.g., the HE AP 502 of FIG. 5 or wireless device 1500) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

ADDITIONAL NOTES AND EXAMPLES

Example 1 is an apparatus of a station (STA), the apparatus comprising: memory to store a first timestamp: processing circuitry to: encode a trigger frame for a second station (STA2); generate a first sounding frame for the STA2, the first timestamp associated with a transmission of the first sounding frame; decode a second sounding frame from the STA2 based upon the first sounding frame, the second sounding frame comprising a holding time indication associated with a second timestamp and a third timestamp, a fourth timestamp associated with receiving the second sound frame, the holding time indication is protected; and calculate a round-trip time based upon the first timestamp, the holding time indication, and the fourth timestamp.

In Example 2, the subject matter of Example 1 includes, the holding time indication comprises the second timestamp and the third timestamp.

In Example 3, the subject matter of Examples 1-2 includes, a random seed.

In Example 4, the subject matter of Examples 1-3 includes, the processing circuitry further configured to: generate a random seed; encode an encrypted frame comprising the random seed for the STA2.

In Example 5, the subject matter of Examples 3-4 includes, to calculate the round-trip time the processing circuitry is configured to: generate a first random number using the random seed; subtract the first random number from the second timestamp, the first random number added to the second timestamp by the STA2; generate a second random number using the random seed; and subtract the second random number from the third timestamp, the second random number added to the third timestamp by the STA2.

In Example 6, the subject matter of Examples 3-5 includes, the processing circuitry configured to: generate a random shift using the random seed; subtract the third timestamp from the second timestamp to create a random holding time; subtract the random shift from the random holding time to create the holding time, the holding time used to calculate the round-trip time.

In Example 7, the subject matter of Examples 3-6 includes, the processing circuitry configured to generate a random linear phase shift using the random seed, the random linear phase shift used to decode the second sounding frame.

In Example 8, the subject matter of Examples 3-7 includes, the processing circuitry configured to generate a random sounding sequence using the random seed, the first sounding frame comprising the random sounding sequence.

Example 9 is a method for a station (STA), the method comprising: encoding a trigger frame for a second station (STA2); generating a first sounding frame for the STA2, the first timestamp associated with a transmission of the first sounding frame; decoding a second sounding frame from the STA2 based upon the first sounding frame, the second sounding frame comprising a holding time indication associated with a second timestamp and a third timestamp, a fourth timestamp associated with receiving the second sound frame, the holding time indication is protected; and calculating a round-trip time based upon the first timestamp, the holding time indication, and the fourth timestamp.

In Example 10, the subject matter of Example 9 includes, the holding time indication comprises the second timestamp and the third timestamp.

In Example 11, the subject matter of Examples 9-10 includes, a random seed.

In Example 12, the subject matter of Examples 9-11 includes, the method further comprising: generating a random seed; and encoding an encrypted frame comprising the random seed for the STA2.

In Example 13, the subject matter of Examples 11-12 includes, the calculating the round-trip time comprises: generating a first random number using the random seed; subtracting the first random number from the second timestamp, the first random number added to the second timestamp by the STA2; generating a second random number using the random seed; and subtracting the second random number from the third timestamp, the second random number added to the third timestamp by the STA2.

In Example 14, the subject matter of Examples 11-13 includes, the method further comprising: generating a random shift using the random seed; subtracting the third timestamp from the second timestamp to create a random holding time; and subtracting the random shift from the random holding time to create the holding time, the holding time used to calculate the round-trip time.

In Example 15, the subject matter of Examples 11-14 includes, the method further comprising generating a random linear phase shift using the random seed, the random linear phase shift used to decode the second sounding frame.

In Example 16, the subject matter of Examples 11-15 includes, the method further comprising generating a random sounding sequence using the random seed, the first sounding frame comprising the random sounding sequence.

Example 17 is at least one computer-readable medium comprising instructions which when executed by a station (STA), cause the STA to perform operations: encoding a trigger frame for a second station (STA2); generating a first sounding frame for the STA2, the first timestamp associated with a transmission of the first sounding frame; decoding a second sounding frame from the STA2 based upon the first sounding frame, the second sounding frame comprising a holding time indication associated with a second timestamp and a third timestamp, a fourth timestamp associated with receiving the second sound frame, the holding time indication is protected; and calculating a round-trip time based upon the first timestamp, the holding time indication, and the fourth timestamp.

In Example 18, the subject matter of Example 17 includes, the holding time indication comprises the second timestamp and the third timestamp.

In Example 19, the subject matter of Examples 17-18 includes, a random seed.

In Example 20, the subject matter of Examples 17-19 includes, the operations further comprising: generating a random seed; and encoding an encrypted frame comprising the random seed for the STA2.

In Example 21, the subject matter of Examples 19-20 includes, the calculating the round-trip time comprises: generating a first random number using the random seed; subtracting the first random number from the second timestamp, the first random number added to the second timestamp by the STA2; generating a second random number using the random seed; and subtracting the second random number from the third timestamp, the second random number added to the third timestamp by the STA2.

In Example 22, the subject matter of Examples 19-21 includes, the operations further comprising: generating a random shift using the random seed; subtracting the third timestamp from the second timestamp to create a random holding time; and subtracting the random shift from the random holding time to create the holding time, the holding time used to calculate the round-trip time.

In Example 23, the subject matter of Examples 19-22 includes, the operations further comprising generating a random linear phase shift using the random seed, the random linear phase shift used to decode the second sounding frame.

In Example 24, the subject matter of Examples 19-23 includes, the operations further comprising generating a random sounding sequence using the random seed, the first sounding frame comprising the random sounding sequence.

Example 25 is an apparatus of a second station (STA2), the apparatus comprising: memory to store a first timestamp: processing circuitry to: decode a trigger frame from a first station (STA1); decode a first sounding frame from the STA1, the first timestamp associated with a transmission of the first sounding frame; and encode a second sounding frame for the STA1 based upon the first sounding frame, the second sounding frame comprising a holding time indication associated with a second timestamp and a third timestamp, a fourth timestamp associated with receiving the second sound frame, the holding time indication is protected.

In Example 26, the subject matter of Example 25 includes, the holding time indication comprises the second timestamp and the third timestamp.

In Example 27, the subject matter of Examples 25-26 includes, a random seed.

In Example 28, the subject matter of Examples 25-27 includes, the processing circuitry further configured to: generate a random seed; encode an encrypted frame comprising the random seed for the STA1.

In Example 29, the subject matter of Examples 27-28 includes, to calculate the round-trip time the processing circuitry is configured to: generate a first random number using the random seed; add the first random number from the second timestamp; generate a second random number using the random seed; and add the second random number from the third timestamp.

In Example 30, the subject matter of Examples 27-29 includes, the processing circuitry configured to: generate a random shift using the random seed; and delay transmission of the second sounding frame by the random shift.

In Example 31, the subject matter of Examples 27-30 includes, the processing circuitry configured to generate a random linear phase shift using the random seed, the random linear phase shift used to encode the second sounding frame.

In Example 32, the subject matter of Examples 27-31 includes, the processing circuitry configured to generate a random sounding sequence using the random seed, the second sounding frame comprising the random sounding sequence.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a station (STA) configured for performing a secure Fine Timing Measurement (FTM) procedure, the apparatus comprising: processing circuitry; and memory, wherein when operating as an initiating STA (ISTA) as part of the secure FTM procedure, the processing circuitry configured to:
encode an initial FTM request frame for transmission to a responding station (RSTA), the initial FTM request frame including an indication for a secure ranging measurement exchange;
decode an initial FTM frame received from the RSTA, the initial FTM frame including long training field (LTF) sequence generating information;
decode a secure sounding trigger frame received from the RSTA, the sounding trigger frame including the LTF sequence generating information;
encode an uplink null data packet (UL NDP) for transmission to the RSTA, wherein the UL NDP is solicited by the secure sounding trigger frame, and wherein the processing circuitry is configured to derive a randomized LTF sounding sequence for the UL NDP from the LTF generating information received in the FTM frame;
decode a downlink NDP (DL NDP) received from the RSTA, the DL NDP having a randomized LTF sounding sequence derived from the LTF generating information; and
decode a location measurement report frame received from the RSTA, the location measurement report frame including range measurement results from the UL NDP and the DL NDP, the range measurement results being masked by a randomized bit sequence.

2. The apparatus of claim 1 wherein the randomized LIT sounding sequence for the UL NDP and the randomized LTF sounding sequence for the DL NDP are derived from a first set of keys, and
wherein the randomized bit sequence used to mask the range measurement results in the location measurement report frame is derived from a second set of keys.

3. The apparatus of claim 2 wherein the randomized LIT sounding sequence for the UL NDP and the randomized LTF sounding sequence for the DL NDP are different.

4. The apparatus of claim 1 wherein the randomized LIT sounding sequence for the UL NDP is encoded for transmission in a high-efficiency (HE) LTF (HE-LTF) of the UL-NDP, and
wherein the randomized LTF sounding sequence for the DL NDP is received in an HE-LTF of the DL-NDP.

5. The apparatus of claim 1, wherein the processing circuitry is configured to derive a key seed prior to initializing the secure FTM procedure by transmission of the initial FTM request frame to the RSTA, the key seed for use in generating a key for protecting the UL NDP.

6. The apparatus of claim 1 wherein the processing circuitry is configured to encode the UL NDP for transmission to the RSTA if a value from the secure sounding trigger frame is equal to a value from the initial FTM frame.

7. The apparatus of claim 1, wherein the UL NDP and DL NDP includes timestamps, and
wherein the link measurement report includes timestamps associated with the UL NDP and DL NDP.

8. The apparatus of claim 1 further comprising: mixer circuitry to down-convert RF signals to baseband signals; and
synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the secure sounding trigger frame received from the RSTA.

9. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry,
wherein the processing circuitry is configured to decode the baseband signals, the baseband signals including the secure sounding trigger frame received from the RSTA.

10. A non-transitory computer-readable storage medium that stores instructions for execution by processing circuitry of a station (STA) to configure the STA performing a secure Fine Timing Measurement (FTM) procedure,
wherein when operating as an initiating STA (ISTA) as part of the secure FTM procedure, the processing circuitry configured to:
encode an initial FTM request frame for transmission to a responding station (RSTA), the initial FTM request frame including an indication for a secure ranging measurement exchange;
decode an initial FTM frame received from the RSTA, the initial FTM frame including long training field (LTF) sequence generating information;
decode a secure sounding trigger frame received from the RSTA, the sounding trigger frame including the LTF sequence generating information;
encode an uplink null data packet (UL NDP) for transmission to the RSTA, wherein the UL NDP is solicited by the secure sounding trigger frame, and wherein the processing circuitry is configured to derive a randomized LTF sounding sequence for the UL NDP from the LTF generating information received in the FTM frame;
decode a downlink NDP (DL NDP) received from the RSTA, the DL NDP having a randomized LTF sounding sequence derived from the LTF generating information; and
decode a location measurement report frame received from the RSTA, the location measurement report frame including range measurement results from the UL NDP and the DL NDP, the range measurement results being masked by a randomized bit sequence.

11. The non-transitory computer-readable storage medium of claim 10 wherein the randomized LTF sounding sequence for the UL NDP and the randomized LTF sounding sequence for the DL NDP are derived from a first set of keys, and
wherein the randomized bit sequence used to mask the range measurement results in the location measurement report frame is derived from a second set of keys.

12. The non-transitory computer-readable storage medium of claim 11 wherein the randomized LTF sounding sequence for the UL NDP and the randomized LTF sounding sequence for the DL NDP are different.

13. The non-transitory computer-readable storage medium of claim 10 wherein the randomized LTF sounding sequence for the UL NDP is encoded for transmission in a high-efficiency (HE) LTF (HE-LTF) of the UL-NDP, and
wherein the randomized LTF sounding sequence for the DL NDP is received in an HE-LTF of the DL-NDP.

14. The non-transitory computer-readable storage medium of claim 10, wherein the processing circuitry is configured to derive a key seed prior to initializing the secure FTM procedure by transmission of the initial FTM request frame to the RSTA, the key seed for use in generating a key for protecting the UL NDP.

15. The non-transitory computer-readable storage medium of claim 10 wherein the processing circuitry is configured to encode the UL NDP for transmission to the RSTA if a value from the secure sounding trigger frame is equal to a value from the initial FTM frame.

16. The non-transitory computer-readable storage medium of claim 10, wherein the UL NDP and DL NDP includes timestamps, and
wherein the link measurement report includes timestamps associated with the UL NDP and DL NDP.

17. An apparatus of a station (STA) configured for performing a secure Fine Timing Measurement (FTM) procedure, the apparatus comprising: processing circuitry; and memory, wherein when operating as responding STA (RSTA) as part of the secure FTM procedure, the processing circuitry configured to:
decode an initial FTM request frame received from an initiating station (ISTA), the initial FTM request frame including an indication for a secure ranging measurement exchange;
encode an initial FTM frame for transmission to the ISTA, the initial FTM frame including long training field (LTF) sequence generating information;
encode a secure sounding trigger frame for transmission to the ISTA, the sounding trigger frame including the LTF sequence generating information;
decode an uplink null data packet (UL NDP) received from the ISTA, wherein the UL NDP is solicited by the secure sounding trigger frame, wherein the UL NDP includes a randomized LTF sounding sequence derived from the LTF generating information of the FTM frame;
encode a downlink NDP (DL NDP) for transmission to the ISTA, the DL NDP having a randomized LTF sounding sequence derived from the LTF generating information; and
encode a location measurement report frame for transmission to the ISTA, the location measurement report frame including range measurement results from the UL NDP and the DL NDP, the range measurement results being masked by a randomized bit sequence.

18. The apparatus of claim 17 wherein the randomized LIT sounding sequence for the UL NDP and the randomized LTF sounding sequence for the DL NDP are derived from a first set of keys, and
wherein the randomized bit sequence used to mask the range measurement results in the location measurement report frame is derived from a second set of keys.

19. The apparatus of claim 18 wherein the randomized LIT sounding sequence for the UL NDP and the randomized LTF sounding sequence for the DL NDP are different, and
wherein the randomized LTF sounding sequence for the UL NDP is received in a high-efficiency (HE) LTF (HE-LTF) of the UL-NDP, and
wherein the randomized LTF sounding sequence for the DL NDP is encoded for transmission in an HE-LTF of the DL-NDP.

* * * * *

UNITED STATES PATENT AND TRADEMARK OFFICE
CERTIFICATE OF CORRECTION

PATENT NO. : 10,715,995 B2
APPLICATION NO. : 16/335510
DATED : July 14, 2020
INVENTOR(S) : Segev et al.

Page 1 of 1

It is certified that error appears in the above-identified patent and that said Letters Patent is hereby corrected as shown below:

In the Claims

In Column 26, Line 24, in Claim 2, delete "LIT" and insert --LTF-- therefor

In Column 26, Line 31, in Claim 3, delete "LIT" and insert --LTF-- therefor

In Column 26, Line 34, in Claim 4, delete "LIT" and insert --LTF-- therefor

In Column 28, Line 46, in Claim 18, delete "LIT" and insert --LTF-- therefor

In Column 28, Line 53, in Claim 19, delete "LIT" and insert --LTF-- therefor

Signed and Sealed this
Twenty-second Day of December, 2020

Andrei Iancu
*Director of the United States Patent and Trademark Office*